United States Patent [19]
Striggow

[11] 3,736,443
[45] May 29, 1973

[54] TRIGGER CIRCUIT

[76] Inventor: Lewis G. Striggow, 1115 Marion Drive, Holly, Mich. 48442

[22] Filed: May 16, 1968

[21] Appl. No.: 729,704

[52] U.S. Cl. ..................307/252, 307/253, 307/305, 307/318

[51] Int. Cl. ..........................................H03k 17/00

[58] Field of Search......................307/252, 305, 253, 307/318

[56] References Cited

UNITED STATES PATENTS

| | | | |
|---|---|---|---|
| 3,189,759 | 6/1965 | Laishley | 307/252 |
| 3,335,291 | 8/1967 | Gutzwiller | 307/253 |
| 3,360,713 | 12/1967 | Howell | 307/305 |
| 3,402,303 | 9/1968 | Painter | 307/253 |
| 3,456,125 | 8/1967 | Cousin | 307/252 |

OTHER PUBLICATIONS

Electronic Design, Aug. 30, 1966, Spofford, pp. 38–40.

Solid State Products, D420-02, August 1959, Applications & Circuit Design Notes, p. 12, FIG. 14.

*Primary Examiner*—Donald D. Forrer
*Assistant Examiner*—David M. Carter

[57] ABSTRACT

A trigger circuit is disclosed which is particularly useful in controlling the conduction of a switching or relay circuit utilizing silicon controlled rectifiers. The relay circuit includes two silicon controlled rectifiers connected in inverted parallel relation with a common gate resistor network. The trigger circuit is connected to the gate resistor network and includes a silicon unilateral switch and a control network. When the silicon unilateral switch is conducting, the relay circuit is turned off, and when the silicon unilateral switch is non-conducting, the relay circuit is turned on. The control network of the trigger circuit can be connected to provide several functions such as sensitivity control, momentary-on and momentary-off control, locking of the on and off conditions and touch control.

2 Claims, 2 Drawing Figures

Figures 1, 2:
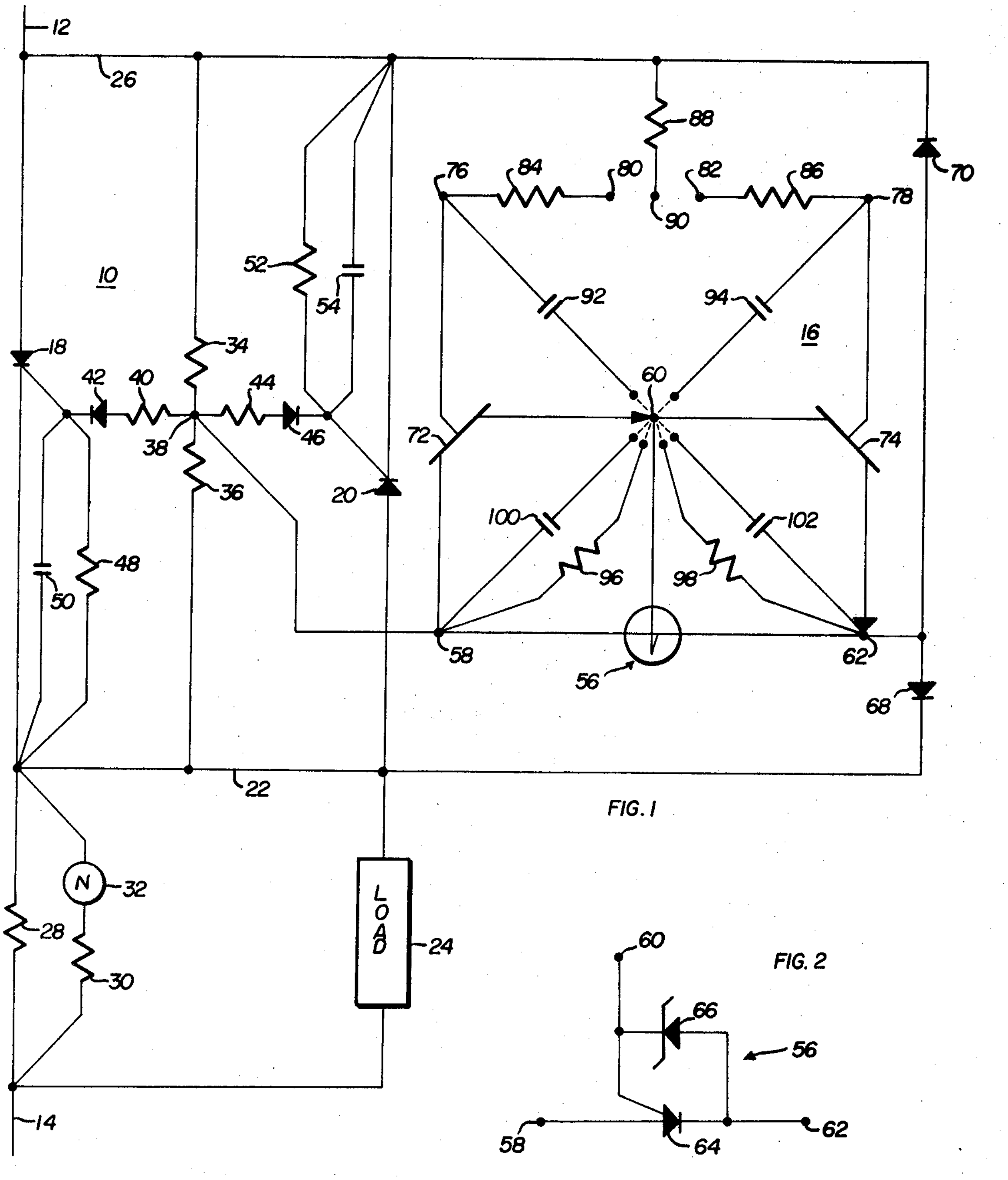

INVENTOR.
LEWIS G. STRIGGOW.
BY
SETTLE, BATCHELDER & OLTMAN.
ATT'YS.

TRIGGER CIRCUIT

BACKGROUND OF THE INVENTION

Switching circuits utilizing silicon controlled rectifiers are available in many forms, and require a trigger circuit to control the conduction of the silicon controlled rectifiers. Such trigger circuits sometimes become quite complicated, particularly if multiple functions are to be performed by it. It would be desirable to provide a multiple function trigger circuit with a minimum number of components and yet which operates reliably and is useful with various types of signal sources.

SUMMARY OF THE INVENTION

The present invention provides a trigger circuit for controlling a switching or relay circuit and for other control purposes, the trigger circuit being based on a silicon unilateral switch or similar semi-conductor device which determines the state of the switching circuit. In one embodiment, the silicon unilateral switch is connected to the gate resistor network for inverted parallel silicon controlled rectifiers and is returned to A.C. lines through diodes. The state of conduction of the silicon unilateral switch is controlled by a network which derives control signals from the A.C. lines, and it can be arranged to provide the functions of sensitivity control, momentary-on and momentary-off control, locking of the on and off conditions and touch control. In essense, the control network includes devices which either shunt the gate of the silicon unilateral switch to its anode to block conduction, or shunt the gate of the silicon unilateral switch to its cathode to avalanche the silicon unilateral switch into conduction.

Accordingly, it is an object of the present invention to provide an improved trigger circuit for triggering a switching circuit utilizing silicon controlled rectifiers on or off.

Another object of the invention is to provide a trigger circuit based on a silicon unilateral switch which may be turned on by shunting its gate to its cathode and may be turned off by shunting its gate to its anode.

Another object of the invention is to provide transistors connected to the silicon unilateral switch of the trigger circuit for turning it on and off, with the transistors being controllable by signals from a signal source.

Another object of the invention is to provide a trigger circuit in which the conduction of a silicon unilateral switch is controlled by touching terminals of the tirgger circuit with the fingers.

Other objects of this invention will appear in the following description and appended claims, reference being had to the accompanying drawings forming a part of this specification wherein like reference characters designate corresponding parts in the several views.

ON THE DRAWINGS

FIG. 1 is a schematic diagram showing a trigger circuit in accordance with the invention connected to and controlling a switching or relay circuit, and FIG. 2 is a schematic diagram of a silicon unilateral switch included within the trigger circuit of FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

The combined circuit of FIG. 1 includes a zero switching relay circuit 10 connected to 60 cycle 120 volt A.C. lines 12 and 14, and a trigger circuit 16 for triggering the relay circuit 10 on or off. The relay circuit 10 will be described briefly first to give the proper background for the description of the trigger circuit 16.

The zero switching relay circuit 10 includes two silicon controlled rectifiers 18 and 20 both connected in series with lines 12 and 14 and in inverted parallel relation with each other. These devices will be referred to in accordance with the usual abreviation as S.C.R. devices. The cathode of S.C.R. 18 and the anode of S.C.R. 20 are connected together by line 22 and are connected to one side of a load 24 which has its other side connected to line 14. The anode of S.C.R. 18 and the cathode of S.C.R. 20 are connected together by line 26 which is connected directly to line 12. A resistor 28 is connected in parallel with load 24, and resistor 28 is shunted by a resistor 30 and a neon bulb 32. Resistors 28 and 30 and neon bulb 32 merely keep the relay circuit complete if the load 24 is removed.

A voltage divider including resistors 34 and 36 is connected between lines 22 and 26. Th junction 38 between resistors 34 and 36 is connected to the gate of S.C.R. 18 by a resistor 40 and a diode 42, and junction 38 is also connected to the gate of S.C.R. 20 by resistor 44 and diode 46. A resistor 48 and a capacitor 50 in parallel with each other connect the gate of S.C.R. 18 to its cathode, and resistor 52 and a capacitor 54 in parallel with each other connect the gate of S.C.R. 20 to its cathode.

Circuit 10 acts as a switch or relay of a balanced design to turn current either on or off through load 24. Neglecting the effect of trigger circuit 16, the S.C.R. 18 and 20 are normally on since the gate resistor network including resistors 34, 36, 40, 44, 48 and 52 provides appropriate control signals on the gates of the two S.C.R.'s so that they both conduct. Due to the inverted parallel relation of the S.C.R.'s 18 and 20, S.C.R. 18 conducts current in one direction and S.C.R. 20 conducts current in the other direction so that alternating current flows through the load 24.

The trigger circuit 16 acts to turn the zero switching relay 10 either on or off. Trigger circuit 16 includes a silicon unilateral switch 56 which is shown symbolically in FIG. 1 and in more detail in FIG. 2. This device 56 will be referred to by its abreviation as S.U.S. 56. The S.U.S. 56 has an anode 58, a gate 60 and a cathode 62. In FIG. 2, it may be seen that the device 56 is actually a combination of a silicon controlled rectifier 64 and a zener diode 66 with the zener diode 66 being connected from the gate 60 to the cathode 62. The gate 60 is connected to the anode side S.C.R. 64, and thus differs from the usual S.C.R. The silicon unilateral switch 56 is available as an integrated circuit.

When a signal is applied across the anode 58 and cathode 62 of S.U.S. 56, the device automatically conducts when the zener voltag is reached. A signal applied to the gate 60 will avalanche or trigger the S.U.S. into conduction at any desired voltage below the zener level. With a signal applied across anode 58 and cathode 62, the device will conduct when the gate 60 is shunted to the cathode 62. When the S.U.S. is thus conducting, it may be turned off by shunting the gate 60 to the anode 58. Varying degrees of shunting may bias the S.U.S. 56 near conduction or near non-conduction if desired. The gate 60, when not shunted, requires a negative signal to turn device 56 on and a positive signal to turn device 56 off.

A diode 68 connects the cathode 62 of device 56 to one side of the load 24, and another diode 70 connects the cathode 62 of device 56 via line 26 to power supplying line 12. The diode 68 and 70 are poled so that unidirectional current flows through S.U.S. 56 when that device is conducting.

Two switching devices are connected to S.U.S. 56, and preferably these switching devices are in the form of transistors 72 and 74. In the illustrated embodiment, transistors 72 and 74 are of the NPN type, and each has the usual emitter, base and collector. The emitter-collector path of transistor 72 is connected between the anode 58 and the gate 60 of S.U.S. 56, the emitter being connected to gate 60 and the collector being connected to anode 58. Similarly, the collector of transistor 74 is connected to gate 60, and the emitter thereof is connected to cathode 62. The bases of transistors 72 and 74 respectively have terminals 76 and 78 to which low voltage signals can be applied directly to control conduction of the transistors, such voltage being supplied from a separate source not shown. If transistor 72 is rendered fully conductive, it shorts anode 58 to gate 60 and thereby blocks conduction of S.U.S. 56, thus turning switching circuit 10 on. If, on the other hand, transistor 74 is rendered fully conductive, it shorts gate 60 to cathode 62 to thereby avalanche S.U.S. 56 into conduction, thus turning off switching circuit 10. If high voltage signals are to be applied to the bases of transistors 72 and 74, they should be applied to terminals 80 and 82 which are connected to terminals 76 and 78 respectively through current limiting resistors 84 and 86 which protect the trigger circuit from damage.

A supply terminal 90 is connected to power supplying line 12 through a large value resistor 88 and line 26, the resistor 88 serving a current limiting function. Terminal 80 or terminal 82 may be selectively directed to terminal 90 as through a switch to supply control signals from line 12 directly to the bases of transistors 72 or 74. However, terminal 80 or terminal 82 may be capacitively coupled to terminal 90 as by touching or by use of a proximity plate. For example, if terminals 80 and 90 are touched simultaneously by a person, there is enough capacitive coupling between the terminals to render transistor 72 conductive, thus blocking S.U.S. 56. Alternatively, if terminals 82 and 90 are touched simultaneously by the person, transistor 74 is rendered conductive, thereby making S.U.S. 56 conduct. A similar type of control may be achieved by connecting a proximity plate to terminal 80 and/or 82 and placing the plate near terminal 90 so as to couple enough signal to the base of the respective transistor 72 or 74 to make it conductive.

A first capacitor 92 may be connected between gate terminal 60 and base terminal 76, and a second capacitor 94 may be connected between gate terminal 60 and base terminal 78. These capacitors serve to desensitize terminals 80 and 82 to the touch or other capacitive coupling effect described in the last preceding paragraph. The values of capacitors 92 and 94 determine the degree of desentizing of terminals 80 and 82. If capacitors 92 and 94 have a very large capacitance value, it is still possible to trigger S.U.S. 56 by touching either terminal 80 or terminal 82 and a grounded or large area conductive substance simultaneously.

It should be noted that terminal 90 could be a source of positive unidirectional current due to the rectifying effects of diodes 68 and 70. A negative signal source could be used by interchanging PNP transistors for the NPN transistors 72 and 74, due to phasing of control signal at junction 58, received from junction 38 of relay 10.

Current limiting resistors 84, 86 and 88 should have relatively large resistance values, say about 1 megohm each. Thus, there is a no voltage bridge when terminals 80 and 90 or terminals 82 and 90 are touched simultaneously, and there is an extremely low voltage bridge when either terminal 80 or terminal 82 is touched by a person who is grounded elsewhere. Resistors 84, 86 and 88 could be replaced by very small valued capacitors, but resistors are more economical.

A resistor 96 may be connected between terminals 58 and 60 to bias S.U.S. 56 to a non-conducting state. Alternatively, a resistor 98 may be connected between terminals 62 and 60 to bias S.U.S. 56 in a conducting state. This biasing may assist the switching capacity or may oppose the switching capacity of transistors 72 and 74.

Assuming that resistor 96 is in circuit, a capacitor 100 may be connected across this resistor to stabilize the non-conductive state of S.U.S. 56. Similarly, if resistor 98 is in cicuit rather than resistor 96, a capacitor 102 may be connected across resistor 98 to stabilize the conducting state of S.U.S. 56. The transistors 72 and 74 will still serve to change the conductive or non-conductive state of S.U.S. 56 depending on which transistor is made conductive. Different values of capacitants of capacitors 100 and 102 may provide delays and desired instability in the conductive state of S.U.S. 56.

With all components except resistors 96 and 98 in circuit, the trigger circuit 16 become externally selectable in function, and will lock in the off or on condition when the momentary applied signal is not drained. When a drainback is provided, the condition becomes momentary with the normally on condition of S.U.S. 56 being predominant.

From the foregoing description, it is apparent that the trigger circuit is very flexible and can provide functions of sensitivity control, momentary on and momentary off control, locking of the conductive state of the circuit, and touch control. Relatively few components are required, and the circuit should operate reliably. It may be possible to construct the circuit in integrated circuit form.

Having thus described my invention, I claim:

1. In combination with a switching circuit for controlling current flow between a pair of lines carrying alternating current, the switching circuit including a pair of silicon controlled rectifiers connected in inverted parallel relation with each other between said lines, a load connected in series with said silicon controlled rectifiers, and a resistor network connected between said lines and the gates of said silicon controlled rectifiers, a trigger circuit for controlling the conduction of said silicon controlled rectifiers including a silicon unilateral switch having an anode, a gate and a cathode, means connecting said anode to said resistor network, means including a diode connecting said cathode to one side of said load, means including another diode connecting said cathode to the line opposite from the load side of said switching circuit, a first switching device connected between the anode and gate of said silicon unilateral switch for blocking conduction thereof by shorting said anode to said gate when said switching device is closed, and a second switching device connected between said gate and said cathode of said silicon unilateral switch for causing conduction thereof when said second switching device is closed, thereby controlling conduction of said silicon unilateral switch to control conduction of said silicon controlled rectifiers.

2. The combination as claimed in claim 1 in which said switching devices each comprise a trnsistor having an emitter, a base and a collector, and including means connecting the emitter-collector path of one of said transistors between the anode and gate of said silicon unilateral switch, means connecting the emitter-collector path of the other transistor between the gate and cathode of said silicon unilateral switch, the bases of said transistors each having a terminal, and a supply terminal connected to said opposite line, whereby simultaneous touching or capacitive coupling or conductive coupling of said supply terminal and either of said base terminals renders the respective transistor conductive to thereby selectively control the conduction of said silicon unilateral switch.

* * * * *